United States Patent [19]

Koziol

[11] Patent Number: 5,257,616
[45] Date of Patent: Nov. 2, 1993

[54] SOLIDIFIED OR SEMISOLIDIFIED FUEL BARBECUE GRILL

[75] Inventor: Walter Koziol, Antioch, Ill.

[73] Assignee: Modern Home Products Corp., Antioch, Ill.

[21] Appl. No.: 964,736

[22] Filed: Oct. 22, 1992

Related U.S. Application Data

[60] Continuation-in-part of Ser. No. 886,120, May 20, 1992, abandoned, which is a division of Ser. No. 653,599, Feb. 11, 1991, Pat. No. 5,143,046.

[51] Int. Cl.⁵ .............................................. F24C 5/00
[52] U.S. Cl. ................................. 126/43; 126/41 R
[58] Field of Search .............................. 126/43–45, 126/41 R, 38, 25 R, 9 R, 1 R; 99/339, 450, 447; 431/326, 315

[56] References Cited

U.S. PATENT DOCUMENTS

| 846,299 | 3/1907 | Garrigan | 431/326 |
|---|---|---|---|
| 1,701,989 | 2/1929 | Turner | |
| 1,991,135 | 2/1935 | Brown | 126/38 |
| 3,025,849 | 3/1962 | Zimmerman | 126/43 |
| 3,130,774 | 4/1964 | Kruck | 126/43 |
| 3,152,585 | 10/1964 | Harrison | 126/2 |
| 3,692,013 | 9/1972 | Grafton et al. | 126/38 |
| 3,753,431 | 8/1973 | Koziol | 126/38 |
| 3,890,952 | 6/1975 | Hamre | 126/45 |
| 3,913,557 | 10/1975 | Ewanika et al. | 126/43 |
| 4,434,781 | 3/1984 | Koziol | 126/25 R |
| 4,539,973 | 9/1985 | Hait | 126/43 |
| 4,708,122 | 11/1987 | Rock | 126/43 |

FOREIGN PATENT DOCUMENTS 335556  1/1959  Switzerland ................... 126/43

Primary Examiner—James C. Yeung
Attorney, Agent, or Firm—Quarles & Brady

[57] ABSTRACT

A portable barbecue grill apparatus wherein the source of heat is a solidified or semisolidified fuel of the alcohol or hydrocarbon type. The barbecue grill apparatus has the usual cover and base number as well as the non-combustible rocks suitably supported between the burner and the cooking grid. Instead of the usual gas burner or grate for charcoal there is provided control mechanisms for adjusting the rate of combustion for the solidified or semisolidified fuel.

16 Claims, 5 Drawing Sheets

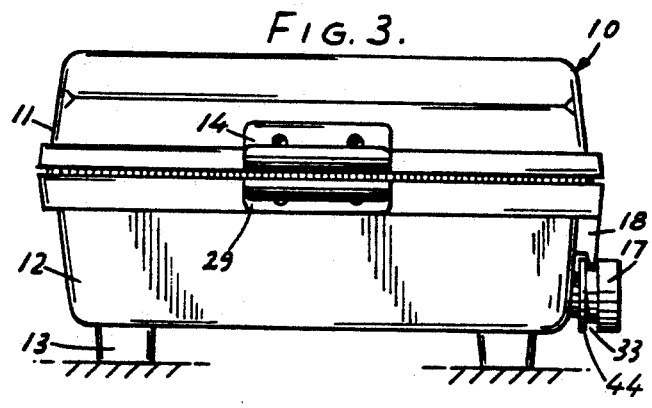
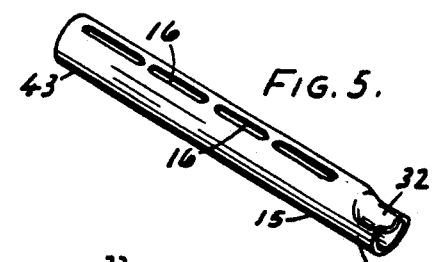
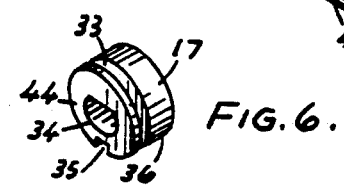
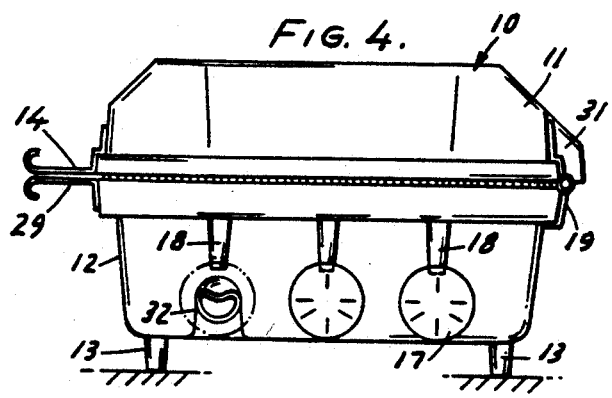
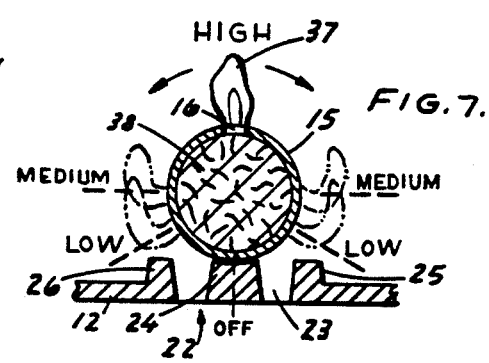
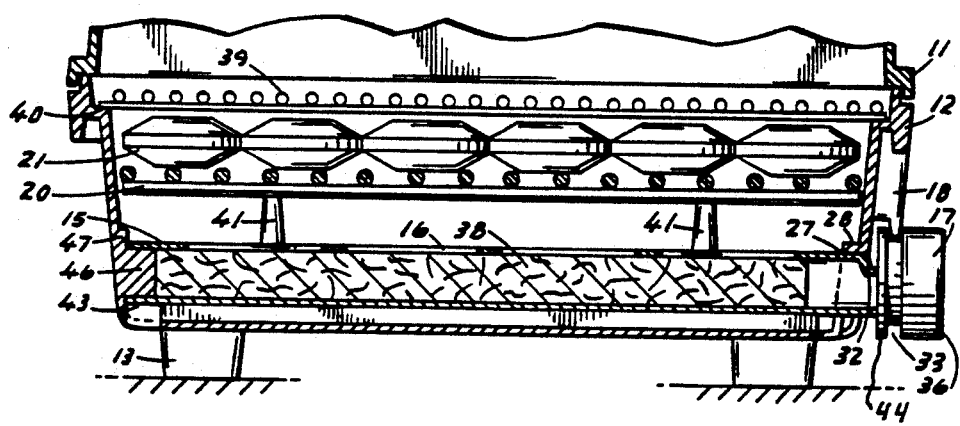
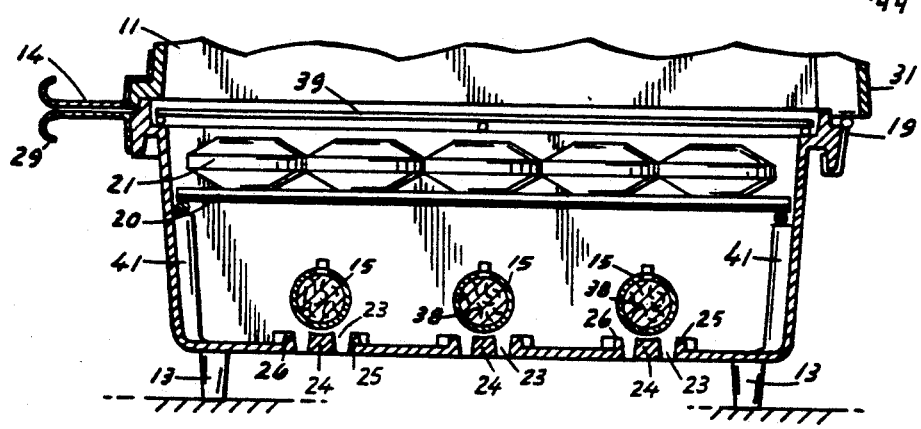

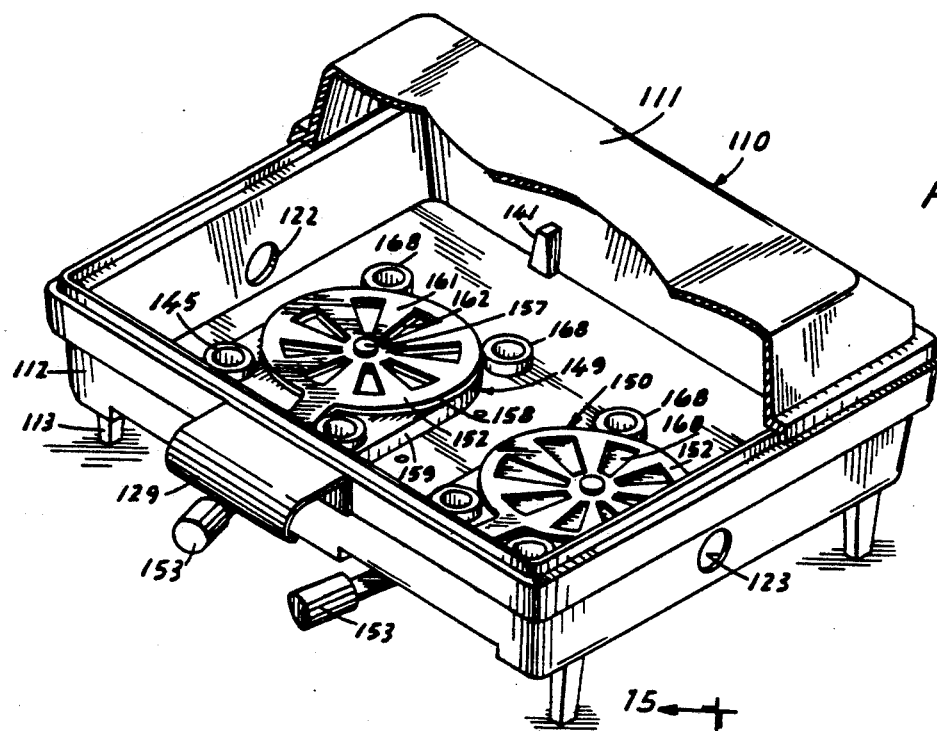

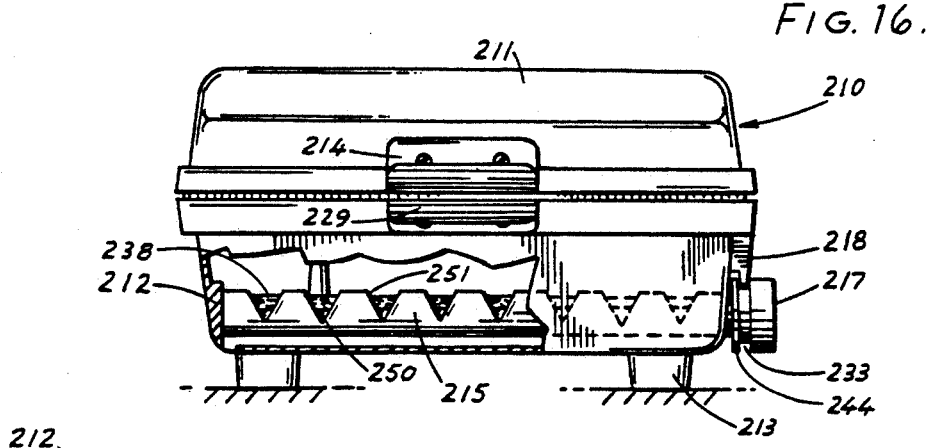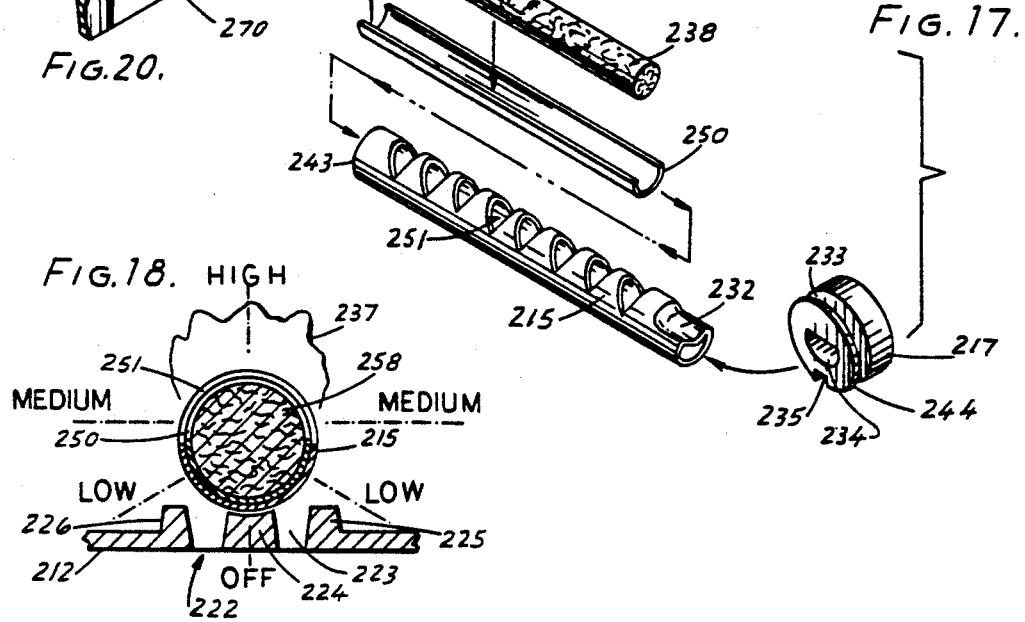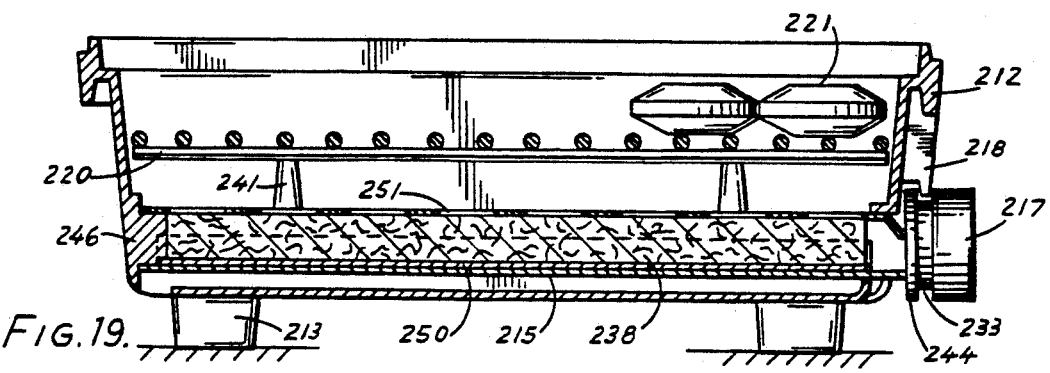

SOLIDIFIED OR SEMISOLIDIFIED FUEL BARBECUE GRILL

CROSS REFERENCE TO RELATED APPLICATIONS

This application is a continuation-in-part of Ser. No. 07/886,120 filed May 20, 1992, abandoned, which is a division of Ser. No. 07/653,599 filed Feb. 11, 1991, U.S. Pat. No. 5,143,046.

BACKGROUND OF THE INVENTION

This invention relates to barbecue grills which can be fueled with a solidified or semisolidified fuel source. More particularly, this invention relates to a barbecue grill which is portable and can be fueled with a solidified or semisolidified fuel source in a manner such that the burning of the fuel can be precisely controlled.

It is common practice to provide either gas or charcoal as a fuel source in a barbecue grill. In a gas barbecue grill a tubular-like burner element of various configurations is utilized. A typical burner element of this sort is described in U.S. Pat. No. 4,434,781. Barbecue grills, whether of the stationary or portable type, have been designed for use with both charcoal and gas. A gas supplied portable barbecue grill unit is disclosed in U.S. Pat. No. 3,753,431. In utilizing a portable grill, it is necessary to keep the weight and the amount of the material necessary to operate the grill at a minimum. Prior to this invention, the use of solidified or semisolidified fuel in portable type burners in mainly camp stoves has been commonplace. For example, U.S. Pat. Nos. 3,025,849; 3,130,774 and 3,152,585 are typical. It would be advantageous to have a barbecue grill apparatus which would utilize a source of a solidified or semisolidified fuel as the heat source and at the same time provide a necessary means of controlling the rate of combustion of the fuel.

It is an advantage of the present invention to provide a barbecue grill apparatus which utilizes as the heat source solidified or semisolidified fuel. Another advantage is a barbecue grill unit wherein the combustion rate of solidified or semisolidified fuel can be adequately controlled. Other advantages are a barbecue grill of the aforementioned type which is portable; offers the same advantages of cooking environment as a standard grill; can be manufactured without special tooling and few parts; and can be readily manufactured and operated without precise tolerances or control methods.

SUMMARY OF THE INVENTION

The foregoing advantages are accomplished and the shortcomings of the prior art are overcome by the present solidified or semisolidified fuel barbecue grill which includes a base member having a support portion which will receive and support a cooking grid member. A solidified or semisolidified fuel support means is associated with the base member to position the solidified or semisolidified fuel below the grid member. Control means are operatively associated with the fuel support means to adjustably expose the fuel to atmosphere. Vent means are operatively associated with the base member to permit outside air to contact the fuel. A vented cover member is supported by the base member and is dimensioned to engage a top of the base member.

In one embodiment, the fuel support means and the means to adjustably expose the fuel are provided by a slotted tubular member which is rotatably mounted in the base member. In another embodiment, the means to adjustably expose the semisolidified fuel to atmosphere is provided by a plurality of shutter mechanisms. In the first-mentioned embodiment, the solidified fuel is in the form of a tubular stick of alcohol whereas in the second-mentioned embodiment it is a jellied hydrocarbon. When the slotted tube arrangement for the tubular solidified fuel is employed a heat control system is afforded. A direct venting system acts in conjunction with both embodiments to supply outside air directly through the bottom of the base member to the fuel.

BRIEF DESCRIPTION OF THE DRAWING

A better understanding of the present solid fuel barbecue grill will be accomplished by reference to the drawings wherein:

FIG. 3 is a front elevational view of the grill apparatus shown in FIG. 1.

FIG. 4 is a side elevational view thereof.

FIG. 5 is a top perspective view of a burner tube for use in the barbecue grill apparatus of FIG. 1.

FIG. 6 is a top perspective view of a knob member for use with the tubular member of FIG. 5.

FIG. 7 is a partial view in vertical section illustrating a combustion control feature of this invention.

FIG. 8 is a view in vertical section taken along line 8—8 of FIG. 2.

FIG. 9 is a view in vertical section taken along the line 9—9 of FIG. 2.

FIGS. 10-13 are views similar to FIGS. 1-4 of an alternative embodiment.

FIG. 16 is a view in side elevation and partially broken away showing a second alternative embodiment.

FIG. 17 is an assembly view of the burner assembly shown in FIG. 16.

FIG. 18 is a view similar to FIG. 7 illustrating another combustion control feature.

FIG. 19 is a view similar to FIG. 8 illustrating the alternative embodiment of FIG. 16.

FIG. 20 is an enlarged partial view showing a post attachment member.

DESCRIPTION OF THE EMBODIMENTS

Figure 1:
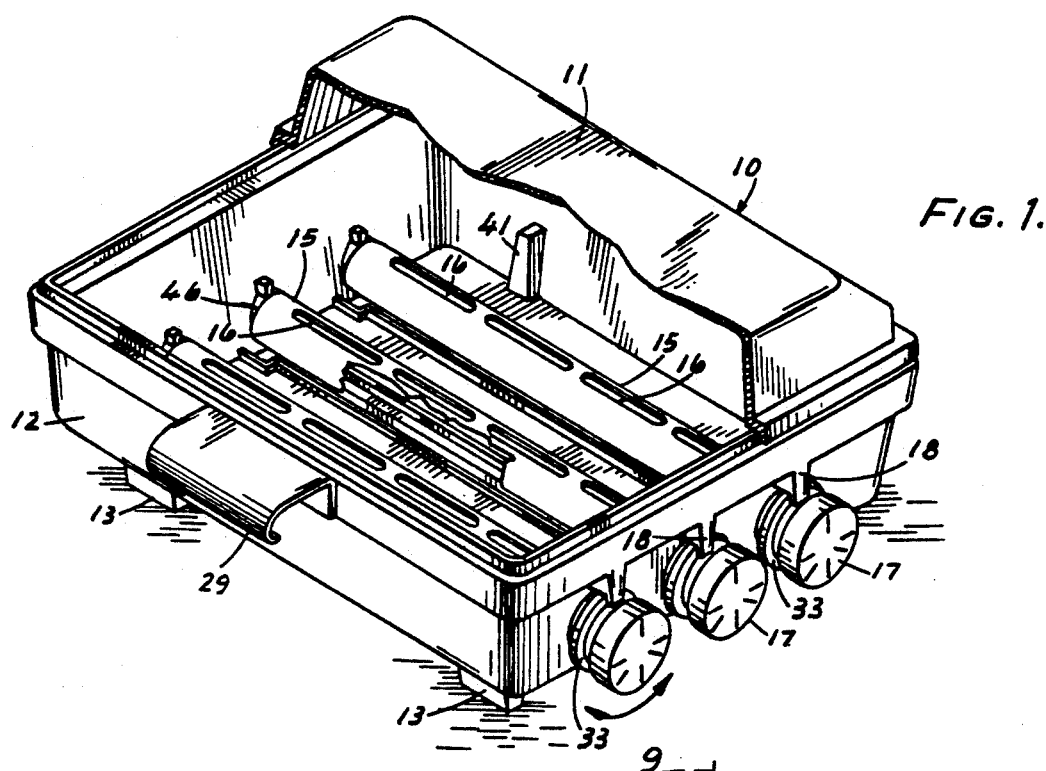
FIG. 1 is a top perspective view with a portion broken away illustrating a solidified fuel barbecue apparatus of this invention.
Figure 2:
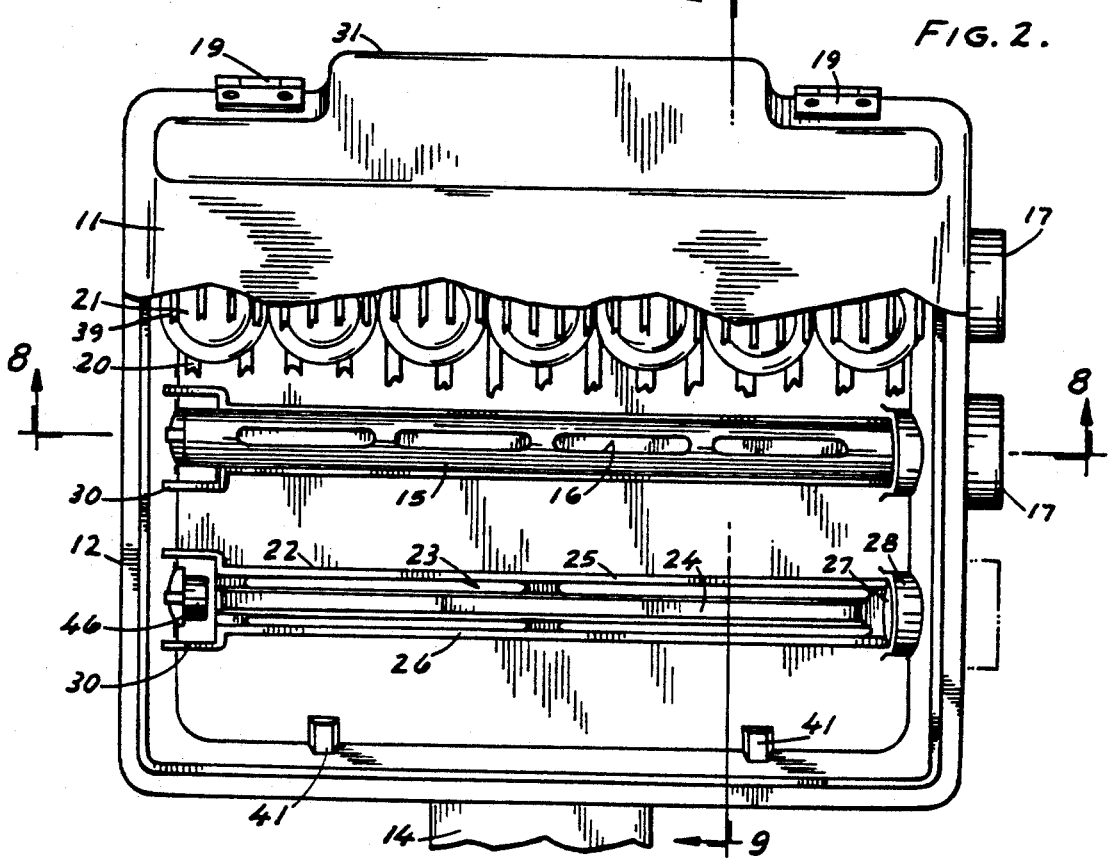
FIG. 2 is a top plan view with a portion broken away further illustrating the solidified fuel barbecue grill apparatus shown in FIG. 1.
Figure 12:
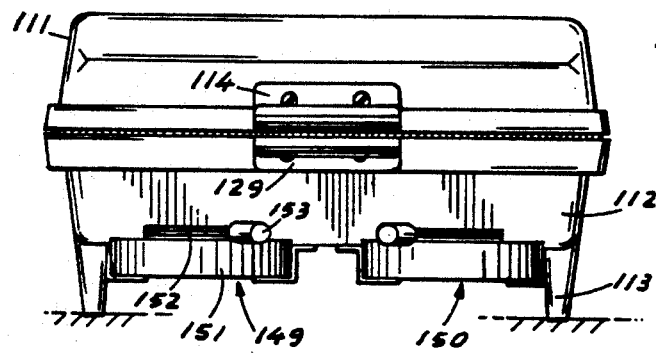
Figure 13:
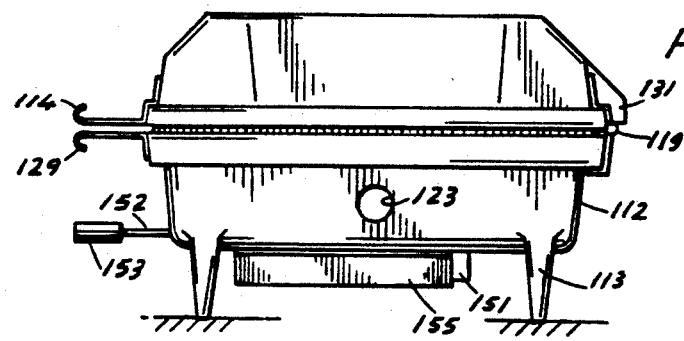

Proceeding to a detailed description of the present invention, and particularly FIGS. 1-4, the solidified fuel grill apparatus generally 10 includes a cover member 11 positioned on the base member 12 having the usual support feet 13. Handles 14 and 29 extend from the base and cover members 11 and 12, respectively. The cover 11 has a back vent member 31 which opens outwardly and downwardly therefrom and hinge member 19 pivotably supports the cover member 11 on the base member 12.

Extending transversely across the bottom of the base member 12 are three burner tubes 15 having slots 16. The burner tubes 15 are rotatably secured in the base member 12 by the knobs 17 having the annular slots 33 engaged by the retaining rib 18.

Referring specifically to FIG. 5, the burner tube 15 has the elongated slots 16 and is otherwise open at both end portions 42 and 43. It will be seen that end portion 42 includes a necked down or D-shaped section 32 which is accommodated in a nonrotatable engagement by the D-shaped passage 34 in the knob 17. This is best seen in FIG. 6 where it will also be noted that the knob 17 includes two knob flanges 36 and 44 separated in part by the annular slot 33. A notch 35 extending through flange 44 is in communication with the annular slot 33 for purposes as will be later explained.

Referring to FIGS. 8 and 9, it will be seen that the grill apparatus 10 includes the usual grate 20 supported on the support posts 41 for positioning the usual porous ceramic briquettes 21 immediately beneath the cooking grid 39. As seen specifically in FIGS. 2 and 8, there is the cylindrical post 46 extending into the base member 12 over which is placed the open end 43 of the tube 15 so as to rotatably position the tube 15 in the base member 12 opposite the flanged knob 17. Post 46 includes the enlarged wall portion 47. Also shown in FIG. 9 is the combined lighting and vent means 22 for the solid alcohol fuel 38 in the tube 15. It has the central rib 24 and the lateral ribs 25 and 26 with the slots 23 therebetween.

An alternative barbecue grill apparatus 110 is shown in FIGS. 10–15 wherein similar components are designated by the same numbers except in the "100" series.

The main difference between grill apparatus 10 and 110 is the burner units generally 149 and 150. As both units are the same only one need be described in detail. As best seen in FIGS. 12–15, fuel cans 151 are employed as a source of semisolid fuel which contain a Sterno jellied hydrocarbon or alcohol 166. They are positioned below the base member 112 by the opposing flanges 154 and 155 which are attached to the base member 112 by the rivets 156. Referring also to FIGS. 10 and 11 positioned over the fuel cans 151 are the shutters 152 composed of a segmented upper plate 158 with segmented openings 160. It is pivotally attached to the raised housing 159 such as by the pivotal attachment 157. Housing 159 also has complementary segmented openings 162. A handle 153 extends from the shutter 152 for the purpose of bringing the openings 160 of upper plate 158 into and out of registration with the openings 162 in housing 159.

Figure 15:
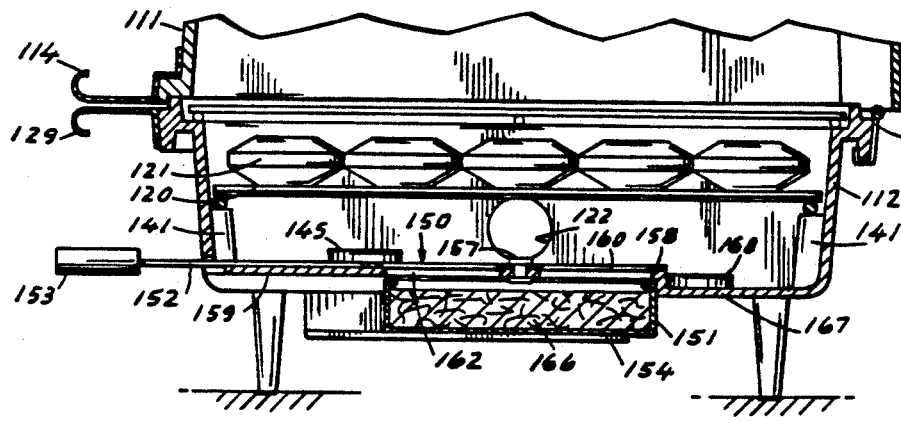
FIG. 15 is a view in vertical section taken along line 15—15 of FIG. 11.

As best shown in FIGS. 10 and 11, the air vents 145 extend through the housing 159 and communicate directly to the outside of the base member 112. Referring to FIG. 15, it is seen that there are additional pairs of vents positioned adjacent the back of the burner unit 150 and extending through the lower base wall 167. One of the raised lips of the vents is shown at 168 which restricts the direct flow of drippings out of the base member 112.

A second alternative barbecue grill apparatus 210 is shown in FIGS. 16–19 wherein similar components are designated by the same numbers except in the "200" series.

Embodiment 210 is similar to embodiment 10 in utilizing a solid stick of solidified alcohol 238. It is different in that it utilizes an additional support member 250 on which the alcohol stick 238 is placed. Support member 250 in this instance is U-shaped and fits inside the burner tube 215 such as by insertion through the end portion 243. Alcohol stick 238 will remain stationary on support member 250 when inside burner tube 215 as an end portion fits into groove 270 of cylinder post 246. V-shaped openings 251 are provided in burner tube 215 and are aligned transversely of the longitudinal axis of the burner tube 215.

OPERATION

A better understanding of the advantages of the solidified fuel barbecue grill apparatus 10 and 110 will be had by description of their assembly and operation. Turning first to grill apparatus 10, the burner tubes 15 will have attached thereto the knob 17 by the inner engagement of the D-neck 32 and the D-slot 34. A solid stick of solidified alcohol 38 is placed in through the end portion 43. The loaded burner tube 15 is then placed through the circular opening 27 in the base 12 with the open end 43 then positioned over the cylindrical post 46. It will be appreciated that in order for the burner tube 15 to be positioned in the manner illustrated in FIG. 8 it will be necessary that the notch 35 be orientated with the retaining rib 18. This allows placement of the retaining rib 18 in the annular slot 33. With the burner tube 15 so positioned in the base 12, the solidified fuel stick 38 is ignited through the slots 16 such as by introducing a flame through slot 23 to produce the flame 37.

The grill assembly is then operated in the normal way. It will be noted specifically in conjunction with FIG. 7 that the slot 16 is in the 12 o'clock position. At this position the flame 37 will be at its highest peak as combustion will be at a maximum. Rotation of the burner tube 15 in either a clockwise or counterclockwise motion so that the slots 16 are not at their highest point with respect to the rotation of the tube 15 will cause the flame to diminish such as indicated at the 3 or 9 o'clock "medium" position illustrated in FIG. 7. Further rotation of the burner tube 15 will effect a still lower rate of combustion as indicated by the low position in FIG. 7. Continuing rotation until the slot 16 is immediately over the central rib 24 causes it to be extinguished as no oxygen will be available for combustion. It will be appreciated that not only does the rotation of the burner tube 15 away from the 12 o'clock position cause the flame to diminish but also increases the distance of the flame from the briquettes 21 and the grid 39. When the solid alcohol fuel 38 needs to be replenished, all that is required is that notch 35 be orientated with the retaining rib 18 and the burner tube 15 removed outwardly through the circular opening 27. A new stick of solid alcohol fuel 38 can then be again placed into the end portion 43 and the previous loading procedure repeated.

Grill apparatus 210 operates in a manner similar to grill apparatus 10 except with respect to flame regulation. As can be seen from FIGS. 17 and 18 with the V-shaped openings 251 or ports orientated with the widest portion of the openings placed in the 12 o'clock position, the maximum amount of fuel from alcohol stick 238 is exposed to atmosphere. This is due to the fact that these openings 251 are out of phase with the support member 250 and not covered by it. This orientation of the openings in the 12 o'clock position also places the flame 237 in the closest proximity to the grate 220 and the briquettes 221. Rotation of the burner tube 215 to either the 3 or 9 o'clock position effects a medium flame as more of the openings 251 are covered by support member 250 and are accordingly rotated away from the grate 220. A low flame is effected with the burner tube 215 rotated to a 5 or 7 o'clock position while the 6 o'clock position extinguishes the flame. It should be appreciated that throughout the rotation of the burner tube 215, the support member 250 remains stationary as does the alcohol stick 238.

For ease of assembly, the solid alcohol stick 238 would be placed on support 250 with the end portion 271 inserted into groove 270. Burner tube 215 would then be fitted over support 250, such as by sliding end portion 243 thereover, and fitting tube 215 onto cylindrical post 246.

Figure 14:
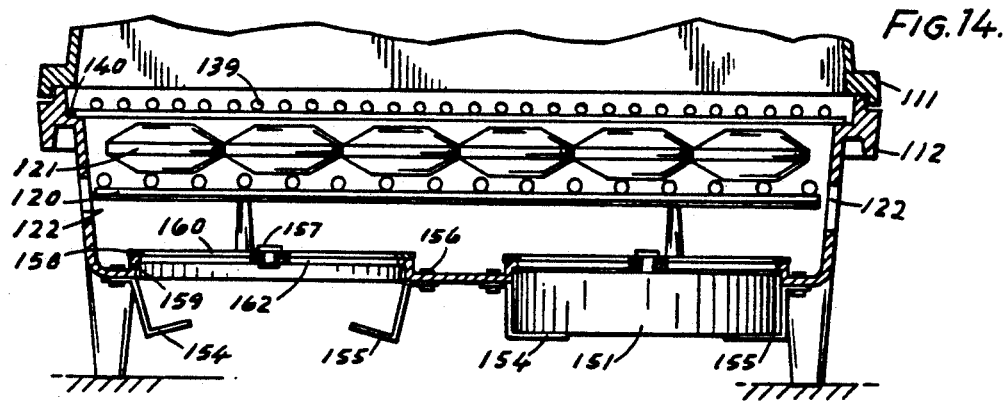
FIG. 14 is a view in vertical section taken along line 14—14 of FIG. 11.

Referring to grill apparatus 110, a round can 151 of Sterno jellied flammable hydrocarbon 166 is fitted between the flanges 154 and 155 so as to be positioned as shown in FIG. 14. Note that the flanges 154 and 155 are biased toward each other so that when the fuel can 151 is fitted therebetween, a secure attachment occurs. The next step is to swing the handle 153 to the solid line position shown in FIG. 11 with respect to burner unit 149. This orientates the openings 160 in the upper plate 158 of the shutter 152 with the openings 162 in the housing 159. This exposes the jellied alcohol 166 to a flame such as from a lighted match which can be inserted in through opening 122. Once the alcohol fuel is ignited, the flame size is regulated by selectively orientating the openings 160 over the openings 162 by movement of the handle 153 as indicated in FIG. 11. To extinguish the flame, the shutter 152 is moved to the position shown for burner unit 150 so that the wedge shaped segments 161 of the shutter 152 cover the openings 162. To replace the fuel can 151, all that is required is to move the flanges 154 and 155 away from each other to allow clearance for the fuel can. A filled fuel can 151 can be reinserted between the flanges as previously indicated.

An important feature of grill apparatus 10, 110 and 210 is the combustion of the fuel including the supply of the air thereto. Note that in all of the embodiments 10, 110 and 210 the outside air is supplied directly to the fuel from the bottom of the barbecue units. This is effected in grill apparatus 10 and 210 by means of the slots 23 and 223 and in grill apparatus 110 by the vents 145 and 168 which communicate directly through the bottom walls of the base members 12, 112 and 212 as well as the housing 159.

In the foregoing description, a preferred fuel 38, 166 or 238 is solidified or semisolidified alcohol. For example, semisolidified fuel could be placed on support 250 as well as solid fuel. However, any type of solidified or semisolidified fuel which will provide cooking temperatures could be employed such as a solidified hydrocarbon as represented by deodorized kerosene as long as the combustion products would not interfere with the flavor of the material to be heated or cooked.

The preferred material for forming the burner tubes 15 and 215 is steel and preferably chrome plated. If desired stainless steel could be employed. The knobs 17 are composed of a heat-resistant plastic although wood or any other heat-resistant material suitable for the indicated purpose be employed. The preferred material for forming the covers 11, 111 and 211, and the base members 12, 112 and 212 is cast aluminum. However, if desired steel could also be employed.

It will thus be seen that through the present invention there is provided a solidified or semisolidified fuel barbecue grill apparatus which is easily operated in conjunction with the solidified or semisolidified fuel. Replenishment of the fuel source is easily accomplished and the grill apparatus employs a minimum number of parts thus resulting in a portable grill at low cost. The foregoing are accomplished in part in one embodiment by means of a unique temperature control feature with both embodiments employing a direct venting system for air.

The foregoing invention can now be practiced by those skilled in the art. Such skilled persons will know that the invention is not necessarily restricted to the particular embodiments therein. The scope of the invention is to be defined by the terms of the following claims as given meaning by the preceding description.

I claim:

1. A solidified or semisolidified fuel barbecue grill apparatus comprising:
    a base member having a support portion constructed and arranged to support a cooking grid member;
    solidified or semisolidified fuel support means connected to said base member to position solidified or semisolidified fuel below said grid member;
    said support means including a fuel support member for said solidified or semisolidified fuel, said fuel support member having an open top portion and further including a tubular member rotatably portioned over said support member, said tubular member having a series of ports therein to adjustably expose said fuel to atmosphere upon rotation thereof and adjustably regulate the temperature of a flame from said fuel with respect to said cooking grid member upon rotation of said tubular member;
    vent means operatively associated with said base member to permit outside air to contact said fuel; and
    a vented cover member supported by said base member and dimensioned to enclose a top of said base member.

2. The barbecue grill apparatus according to claim 1 wherein said port are defined by side-to-side slotted ports.

3. The barbecue grill apparatus according to claim 2 wherein said vent means is positioned through a floor portion of said base member and immediately adjacent said tubular fuel support means.

4. The barbecue grill apparatus according to claim 3 wherein said tubular member is rotatably mounted in said base member by a cylindrical post member.

5. The barbecue grill apparatus according to claim 4 wherein a multiplicity of said tubular members are mounted in said base member.

6. The barbecue grill apparatus according to claim 5 further including control knobs mounted for rotation with said tubular members.

7. The barbecue grill apparatus according to claim 1 further including a grate support member with noncombustible briquettes positioned in said base member and between said cooking grid member and said tubular member.

8. The barbecue grill apparatus according to claim 7 wherein said fuel is jellied alcohol.

9. The barbecue grill apparatus according to claim 1 wherein said fuel support member is connected and fixed to said base member.

10. A base member for a barbecue grill wherein the source of heat for said barbecue grill is solidified or semisolidified fuel comprising:
    a housing member having a floor portion and constructed and arranged to support a cooking grid member and a grate member below said grid member for supporting noncombustible briquettes;

fuel support means connected to said base member to position solidified or semisolidified fuel below said grate member for said briquettes;

said fuel support means including a fuel support member for said solidified or semisolidified fuel, said fuel support member having an open top portion and further including a tubular member rotatably positioned over said support member, said tubular member having a series of ports therein to adjustably expose said fuel to atmosphere upon rotation thereof and adjustably regulate the temperature of a flame from said fuel with respect to said grate member upon rotation of said tubular member; and vent means operatively associated with said base member to permit outside air to contact said fuel.

11. The base member for a barbecue grill according to claim 10 wherein said fuel is a solidified fuel.

12. The base member for a barbecue grill according to claim 10 wherein said ports are defined by side-to-side slotted ports.

13. The barbecue grill apparatus according to claim wherein said fuel support member is connected and fixed to said base member.

14. A solidified or semisolidified fuel barbecue grill apparatus comprising;

a base member having a support portion constructed and arranged to support a cooking grid member;

solidified or semisolidified tubular fuel support means rotatably connected to said base member to position solidified or semisolidified fuel below said grid member;

said tubular support means including ports to adjustably regulate the temperature of a flame from said fuel with respect to said cooking grid member upon rotation of said tubular support means;

a know member connected to said support means;

connecting means operatively associated with said knob member and said base member to connect said knob member to said base member and provide rotatable retention of said knob member thereon;

vent means operatively associated with said base member to permit outside air to contact said fuel; and a vented cover member supported by said base member and dimensioned to enclose a top of said base member.

15. The barbecue grill apparatus according to claim 14 wherein said grill connecting means is defined by a projecting member extending from said base member and an annular slot in said knob member to receive said projection.

16. The barbecue grill apparatus according to claim 15 further including a passage extending between said annular slot and an outer surface of said knob to provide placement of said projecting member in said slot.

* * * * *

UNITED STATES PATENT AND TRADEMARK OFFICE
CERTIFICATE OF CORRECTION

PATENT NO. : 5,257,616
DATED : November 2, 1993
INVENTOR(S) : Walter Koziol It is certified that error appears in the above-identified patent and that said Letters Patent is hereby corrected as shown below:

Column 6
Claim 1, lines 11 and 12 after "rotatably" "por-tioned" should be --positioned--.

Claim 2, line 2 after "said" "port" should be --ports--.

Column 8
Claim 14, line 13 before "member" "know" should be --knob--.

Signed and Sealed this

Thirteenth Day of June, 1995

Attest:

BRUCE LEHMAN

Attesting Officer     Commissioner of Patents and Trademarks